United States Patent [19]

Modone et al.

[11] 4,389,230

[45] Jun. 21, 1983

[54] PROCESS FOR IMPROVING THE TRANSMISSION CHARACTERISTICS OF OPTICAL FIBERS DRAWN FROM PREFORMS MADE BY THE MCVD TECHNIQUE

[75] Inventors: Eros Modone, Turin; Giacomo Roba, Cogoleto, both of Italy

[73] Assignee: Cselt Centro Studi E Laboratori Telecomunicazioni S.P.A., Turin, Italy

[21] Appl. No.: 273,423

[22] Filed: Jun. 15, 1981

[30] Foreign Application Priority Data

Jun. 16, 1980 [IT] Italy .............................. 67934 A/80

[51] Int. Cl.³ ...................................... C03B 37/075
[52] U.S. Cl. ................................... 65/3.12; 427/163
[58] Field of Search ................ 65/3.12, 3.2; 427/163

[56] References Cited

U.S. PATENT DOCUMENTS 3,791,714  2/1974  Maurer ........................... 65/3.12 X

OTHER PUBLICATIONS

Kato et al., "Isotopic Chemical Vapor Deposition . . . " Applied Optics, Jun. 1977, vol. 16, No. 6, pp. 1453 and 1454.

Primary Examiner—Richard V. Fisher
Attorney, Agent, or Firm—Karl F. Ross

[57] ABSTRACT

In order to improve the transmission characteristics of optical fibers drawn from the preforms manufactured by vapor deposition of silica on an inner wall surface of a supporting tube of glass, the tube is subjected to a two-stage heat treatment with deuterium whereby $OH^-$ groups at least on the inner tube surface are isotopically replaced by $OD^-$ groups. This pretreatment can be carried out in the same apparatus which is subsequently used for producing the preform.

5 Claims, 2 Drawing Figures

PROCESS FOR IMPROVING THE TRANSMISSION CHARACTERISTICS OF OPTICAL FIBERS DRAWN FROM PREFORMS MADE BY THE MCVD TECHNIQUE

FIELD OF THE INVENTION

Our present invention relates to a process for improving the transmission characteristics of optical fibers drawn from preforms which are produced by the so-called MCVD (modified chemical-vapor deposition) technique.

BACKGROUND OF THE INVENTION

A preform made by the well-known MCVD process consists of a tube of silica glass surrounding a core which is built up by vapor deposition of successive layers of suitably doped silica on its inner wall surface. The tube, after drawing, becomes the outer sheath or cladding of the fiber.

Silica is known to have a minimum-attenuation window in a wavelength range between 0.7 and 1.6$\mu$, in a zone of overlapping tail ends of spectral regions of ultraviolet absorption due to electronic transitions and infrared absorption due to molecular vibrations. The utility of this range for the transmission of optical signals is, however, further restricted by two absorption peaks at the second and third harmonics of the fundamental vibration of the hydrogen-oxygen bond which corresponds to a wavelength of 2.8$\mu$. This absorption is due to contamination by hydroxyl (OH$^-$) groups in the fiber material which is particularly noticeable in fibers drawn from preforms made by the MCVD technique, owing apparently to the fact that the elevated temperatures used in the process promote the diffusion of such groups from the supporting tube into the core of the preform. This assumption is based on the observation that the concentration of various contaminants originally present in the supporting tube and in the employed reagents decreases exponentially toward the preform axis; after drawing, the same law of distribution is found to exist in the finished fiber.

The contamination by impurities (e.g. halides or oxygen) present in the reagents can be reduced by various purification methods such as distillation, sublimation, filtering or the use of photochemically activated chlorine. As far as we are aware, however, there has not yet been found a satisfactory solution to the problem of contamination of the preform core by OH$^-$ groups released from its supporting tube. Thus, for example, the interposition of a barrier layer of low-viscosity compounds between the inner tube wall and the first chemically desposited core layer has only a limited effect in reducing the contamination.

OBJECT OF THE INVENTION

The object of our present invention, therefore, is to provide a process for improving the transmission characteristics of optical fibers of the type referred to by minimizing the diffusion of hydroxyl groups from the supporting tube into the core of the preform from which they are subsequently drawn.

SUMMARY OF THE INVENTION

We realize this object, in accordance with our present invention, by subjecting at least the inner wall surface of the supporting tube to a pretreatment with deuterium at elevated temperatures and for a period sufficient to substitute deuterium atoms for a significant number of hydrogen atoms in the tube material close to that inner wall surface.

We have found, in accordance with a more particular feature of our invention, that this pretreatment of the tube surface is advantageously carried out in two stages, i.e. a first treatment stage in which the inner wall surface of the tube is maintained in contact with gaseous deuterium at a relatively low elevated temperature for inducing deuterium adsorption by the tube wall and a second treatment stage in which the temperature is sharply increased for promoting the replacement of hydrogen by deuterium. The latter is preferably maintained during both stages at a somewhat elevated pressure, e.g. of one or two atmospheres gauge. Suitable temperature ranges are between about 100° and 200° C. in the first stage and at or above 500° C. in the second stage. The resulting isotopic exchange between hydrogen and deuterium replaces a number of OH$^-$ groups inside the silica matrix with OD$^-$ groups; since the O—D bond has a fundamental vibration wavelength of about 3.9$\mu$ compared with the aforementioned wavelength of 2.8$\mu$ for the O—H bond, the second harmonic falls with 1.95$\mu$ outside the minimum-attenuation window of 0.7 to 1.6$\mu$ available for signal transmission. While the third harmonic (1.3$\mu$) still lies within that range, its magnitude is much lower than that of the second harmonic—by about 90 dB/km/ppm—so that its absorption effect is negligible.

BRIEF DESCRIPTION OF THE DRAWING

The process of our invention will now be described in detail with reference to the accompanying drawing in which FIGS. 1 and 2 schematically represent two modes of operation.

SPECIFIC DESCRIPTION

Figure 1:
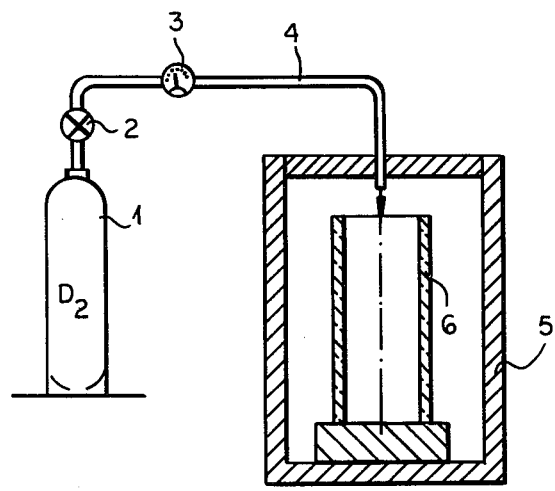

In FIG. 1 we have shown a tank 1 in which deuterium gas D$_2$ is stored under pressure, this tank communicating with a hermetically sealed muffle furnace 5 via a conduit 4 including a control valve 2 and a flow gauge 3. A silica-glass tube 6, to be subsequently used in the production of a fiber-drawing preform by the conventional MCVD technique already referred to, is placed in the furnace 5 so as to be fully immersed in a deuterium atmosphere under an elevated pressure as indicated above.

In a first treatment stage, the furnace is maintained for several hours at a temperature between about 100° and 200° C. In a second treatment stage the temperature is raised to at least 500° C. and maintained at that higher level for about one hour.

The isotopic substitution of deuterium for hydrogen, occurring in this second stage, is facilitated by the difference in bonding energy which at 25° C. is 463 KJ/mole for O—H bonds and 469 KJ/mole for O—D bonds.

In FIG. 2 we have again shown a silica-glass tube 6, designed to be made part of a fiber-drawing preform by the aforedescribed MCVD process, which is clamped at opposite ends by a pair of tubular chucks 7 and 8 in hermetically sealed relationship therewith. The tube 6 is spacedly surrounded by an axially movable annular heater or ring furnace 9. In a first treatment stage, gaseous deuterium preheated to a temperature of about 100° to 200° C. (e.g. in a muffle furnace as shown in FIG. 1) is circulated under elevated pressure through the two chucks 7, 8 and the interior of tube 6 for a period of several hours to induce deuterium adsorption on the inner wall surface of the tube, as in the previous instance. In the second stage the ring furnace 9 (which up to that point may have been maintained at the same temperature as the gas flow) is heated to at least 500° C. and is slowly reciprocated along the tube as indicated by an arrow A; at the same time, the tube and its mandrels are rotated about their axis as indicated by an arrow B.

Figure 2:
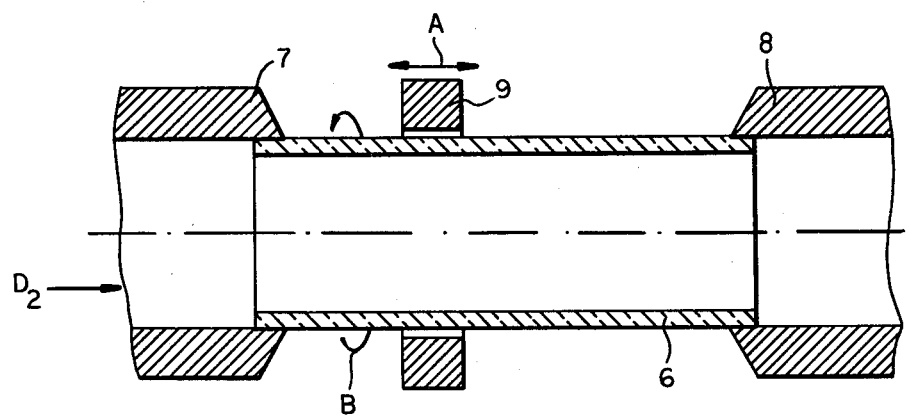

Whereas the treatment of FIG. 1 involves both the inner and the outer tube surface, the procedure of FIG. 2 is limited to the inner surface which, however, is the one primarily contributing to the contamination of the fiber core in its untreated state. This second method, moreover, has the advantage that the existing assembly of tube 6, chucks 7, 8 and heater 9 can be used for the subsequent vapor deposition of the preform core without any intervening handling whereby the risk of accidental contamination after the pretreatment is avoided.

We claim:

1. A process for improving the transmission characteristics of optical fibers drawn from preforms which are produced by vapor deposition of silica on an inner wall surface of a supporting tube of silica glass,
   comprising the step of subjecting at least said inner wall surface of the supporting tube to a pretreatment with deuterium at elevated temperatures and for a period sufficient to isotopically replace a significant number of hydrogen atoms in the tube material close to said inner wall surface with deuterium atoms, said inner wall surface being maintained in contact with gaseous deuterium at a relatively low elevated temperature for inducing deuterium adsorption by the tube wall in a first treatment stage followed by a sharp temperature increase in a second treatment stage for promoting the substitution of hydrogen by deuterium in the tube material.

2. A process as defined in claim 1 wherein the temperature is maintained in a range of substantially 100° to 200° for a period of several hours in said first treatment stage and is then raised to at least 500° C. for approximately one hour in said second treatment stage.

3. A process as defined in claim 1 or 2 wherein the entire tube is immersed in a deuterium atmosphere at elevated pressure in both said first and said second treatment stage.

4. A process as defined in claim 1 or 2 wherein the tube is traversed by a flow of pressurized and preheated deuterium gas in said first and second treatment stages.

5. A process as defined in claim 4 wherein the tube is subjected in said second treatment stage to additional localized heating from without.

* * * * *